Oct. 23, 1962        H. VISSERS        3,059,935

APPARATUS FOR SPREADING PULVERIZED OR GRANULAR FERTILIZERS

Filed June 12, 1961

INVENTOR

HERBERT VISSERS

BY

ATTORNEYS

United States Patent Office 3,059,935
Patented Oct. 23, 1962

3,059,935
APPARATUS FOR SPREADING PULVERIZED
OR GRANULAR FERTILIZERS
Herbert Vissers, Nieuw Vennep, Netherlands, assignor to Landbouwwerktuigen- en Machinefabriek H. Vissers N.V., Nieuw Vennep, Netherlands
Filed June 12, 1961, Ser. No. 116,388
Claims priority, application Netherlands Aug. 15, 1960
2 Claims. (Cl. 275—7)

This invention relates to an apparatus for spreading pulverized or granular fertilizers, which is provided with a hopper supported by a travelling frame and from which the fertilizer is discharged through a spout located below said hopper and extending opposite to the travelling direction of the frame and having on both sides one or more holes in its side wall, said spout being angularly reciprocated in transverse direction.

Certain fertilizers attracting moisture tend to adhere to the wall of the spout, which usually consists of metal, so that the passage area of the spout is continually reduced and the spout can completely be clogged.

The invention has for its object to remove said drawback of the known fertilizer spreading apparatus of the kind referred to. According to the invention a sleeve of elastic material, such as rubber is mounted in the spout and extends into the spout with clearance around its circumferential wall. Whenever the spout reaches the end of its stroke on its transverse reciprocation said elastic sleeve will bump against the rigid wall of the spout and be deformed thereby, so that the fertilizers contained in the spout is loosened from the wall of the sleeve and cannot adhere into the sleeve.

The invention will be further desecribed with reference to the accompanying drawing illustrating an embodiment of the apparatus according to the invention.

Figure 1:
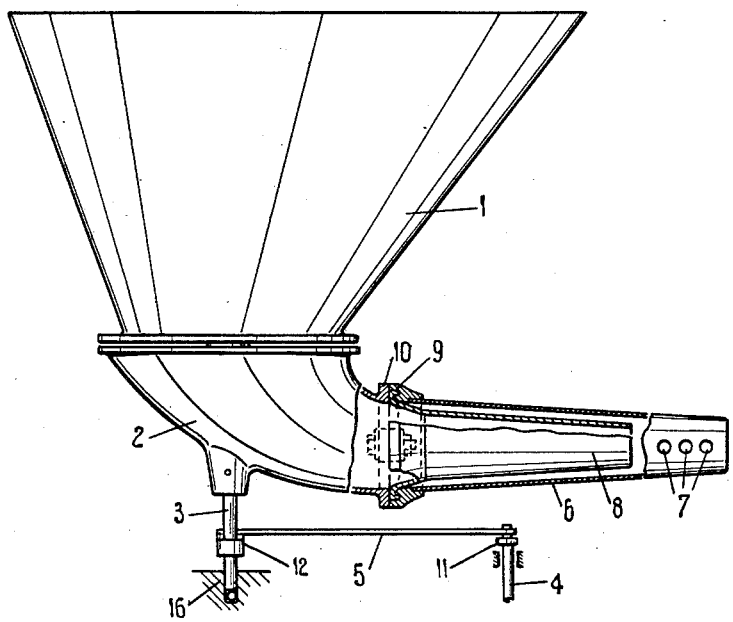

In the drawing FIG. 1 is an elevation of the hopper and the spout with partial sectional view.

Figure 2:
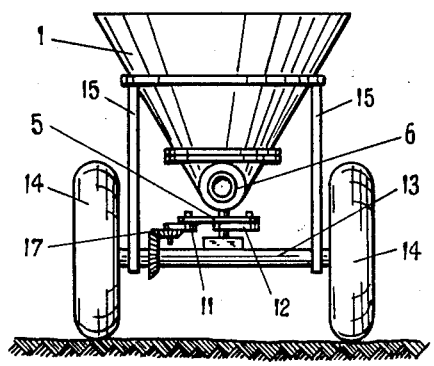

FIG. 2 is a rear view of the apparatus on a smaller scale.

Below the hopper 1 containing the fertilizer to be spread a bowl 2 is mounted, which is secured on a shaft 3 driven by a crank 11 secured on a shaft 4 and connected by a rod 5 to a lever 12 secured on the shaft 3 of the bowl 2.

The hopper 1 is supported on a frame 15 provided with ground wheels 14 secured to an axle 13. Shaft 3 at its lower end at 16 is supported in the frame 15. Shaft 4 is driven by axle 13 through a gearing 17.

Secured to the bowl 2 is a spout 6 having at both sides discharge slots or circular holes 7. Said spout at its end remote from the hopper 1 may be open for discharging the fertilizer at said end. In the spout 6 a sleeve 8 consisting of rubber or like resilient material is mounted and has clearance at its circumferential wall with respect to the wall of the spout. The sleeve 8 has a flange 9 and through said flange the sleeve is clamped onto a flange 10 of the bowl 2. If now the bowl 2 with the spout 6 is angularly reciprocated the elastic sleeve 8 at the end of each stroke of the spout will bump against the rigid wall of the spout, whereby the sleeve is deformed and the fertilizer is loosened from the wall of the sleeve, so that the fertilizer is prevented from adhering in the sleeve.

What I claim is:

1. An apparatus for spreading pulverized or granular fertilizers comprising a travelling frame, a hopper supported by said frame, a spout rotatably supported on said frame and located below said hopper for receiving fertilizer therefrom, said spout extending opposite to the travelling direction of the frame, means for angularly reciprocating said spout in a direction transverse to the direction of movement of said frame, and a sleeve of elastic material mounted in the spout so as to extend therein with clearance around its circumferential wall.

2. An apparatus for spreading fertilizers according to claim 1 wherein at least a pair of oppositely disposed discharge openings are provided in the side wall of said spout.

References Cited in the file of this patent

UNITED STATES PATENTS

| | | |
|---|---|---|
| 154,842 | Codville | Sept. 8, 1874 |
| 1,570,795 | Tainton | Jan. 26, 1926 |
| 2,185,021 | Ballany et al. | Dec. 26, 1939 |
| 2,720,341 | Stirn et al. | Oct. 11, 1955 |
| 2,993,699 | Van Der Lely et al. | July 25, 1961 |